United States Patent [19]
Sinden

[11] 3,833,840
[45] Sept. 3, 1974

[54] CYLINDRICALLY ARRANGED MODULAR MAIN DISTRIBUTION FRAME

[75] Inventor: Frank William Sinden, Summit, N.J.

[73] Assignee: Bell Telephone Laboratories, Incorporated, Murray Hill, N.J.

[22] Filed: June 14, 1973

[21] Appl. No.: 369,901

[52] U.S. Cl. .......... 317/122, 317/101 CB, 339/17 N
[51] Int. Cl. .......... H02b 1/04
[58] Field of Search...317/99, 100, 101 CB, 101 CM, 317/101 CE, 122, 101 D, 101 DH; 174/72 A; 339/17 M, 17 N, 18 R, 18 B, 18 C

[56] References Cited

UNITED STATES PATENTS

| | | | |
|---|---|---|---|
| 3,219,886 | 11/1965 | Katzin | 339/17 N |
| 3,443,161 | 5/1969 | King | 317/101 CB |
| 3,495,134 | 2/1970 | Collins | 317/100 |
| 3,563,882 | 2/1971 | Kimura | 317/122 |
| 3,745,399 | 7/1973 | Usizima | 317/99 |

*Primary Examiner*—Robert K. Schaefer
*Assistant Examiner*—Gerald P. Tolin
*Attorney, Agent, or Firm*—C. S. Phelan

[57] ABSTRACT

A modular main distribution frame having a plurality of modules is configured such that the modules are radially arranged about a stack of quasi-circular interconnection circuit boards. Each of the modules has a plurality of terminal strips affixed thereto in an angularly alternating arrangement. Those terminal strips having a first angular orientation terminate outside cable pairs while those with the opposite angular orientation terminate equipment cable pairs. Interconnection between equipment and outside cable pairs normally occurs between adjacent terminal strips. Where the cable and equipment terminal pairs are not in the same module, interconnection is effected through one of the interconnection circuit boards. This arrangement permits any equipment terminal pair to be accessible to any line terminal pair by using only short, easily removable jumpers.

6 Claims, 19 Drawing Figures

PATENTED SEP 3 1974

3,833,840

SHEET 2 OF 9

SERVICE ORDER

| | BAY | TERM. STRIP | TERM. | ROW | TERM. | BAY | TERM. STRIP | TERM. |
|---|---|---|---|---|---|---|---|---|
| INTRA-BAY CONNECTION (SINGLE JUMPER) | C | 6 | 19 | — | — | C | 7 | 105 |
| INTER-BAY CONNECTION | C | 4 | 52 | 8 | 5 | F | 9 | 83 |

JUMPER IN BAY C

JUMPER IN BAY F

CYLINDRICALLY ARRANGED MODULAR MAIN DISTRIBUTION FRAME

BACKGROUND OF THE INVENTION

1. Field of the Invention

This invention relates to telephone central office main distribution frames and, in particular, to frames of the modular type.

2. Description of the Prior Art

The main distribution frame within a telephone central office serves as the termination point for outside cable pairs from each of the individual subscribers, as well as the termination point for various central office equipments, particularly, the multiple switch terminals of the switching equipment. Interconnection of a subscriber or line terminal pair to a switch or equipment terminal pair is effected on the main frame by means of jumper cables.

With a linear main frame, one wherein all of the terminals lie in the same plane or in parallel planes, these jumper cables can vary in length from a few feet to several tens of feet. Such a variation in jumper cable length is expensive in both the cost of material and the cost of labor for installation and, in addition, gives rise to a further complication in that the removal of the longer length jumpers becomes extremely difficult when interconnection wiring changes are to be implemented. Quite frequently, the removal of a relatively long jumper from the main frame will result in the abrading and burning of the insulation on neighboring wires. Allowing an abraded jumper to remain on the main frame would cause it to be susceptible to malfunction through short circuits. An additional deleterious effect of employing relatively long length jumper cables is that the density of jumper cables builds up causing increased congestion and inefficiency in the utilization of a main frame.

Accordingly, it is one object of the present invention to configure a main distribution frame wherein the maximum length of the interconnection jumper cables is substantially reduced from that needed to effect an interconnection on a linearly arranged main frame.

A further object of the present invention is to reduce the density of interconnection jumper cables.

An additional object is to configure a distribution frame wherein jumper cable removal is facilitated while reducing the tendency to cause damage to adjacent jumpers.

Still another object of the present invention is to provide a main distribution frame which will alleviate congestion and inefficiency caused by jumper cable buildup.

Yet a further object is to reduce the cost of both labor and materials required to effect changes in interconnection wiring.

SUMMARY OF THE INVENTION

The foregoing and other objects of the invention are realized in an illustrative embodiment wherein a plurality of main distribution frame modules are radially arranged about a stack of quasi-circular interconnection circuit boards. This cylindrical configuration gives rise to one aspect of the present invention in that it significantly decreases the maximum length of an interconnection jumper cable.

Each module has a plurality of terminal strips affixed thereto in a zig-zag arrangement with those strips in the zig direction terminating an individual subscriber's outside cable pairs while those terminal strips in the angularly opposite direction terminate central office equipment cable pairs. The angularly alternating arrangement of equipment terminal strips and outside cable or line terminal strips gives rise to another feature of the invention in that such an arrangement results in a reduction in the density of jumper cables.

Interconnection between equipment or switch terminal pairs and cable terminal pairs normally occurs between adjacent terminal strips. Where the cable terminal pairs and the switch terminal pairs are not in the same module, interconnection is effected through one of the interconnection circuit boards. This interconnection arrangement provides a further aspect of the present invention in that the reduced length and reduced density of interconnection jumpers facilitates easy removal of a jumper while decreasing the tendency to damage adjacent jumpers. In addition, this arrangement reduces the tendency for jumper cable buildup with its resultant congestion and inefficient utilization of space.

Moreover, this arrangement permits any switch terminal pair to be accessible to any line terminal pair. The ready accessibility and the utilization of short jumpers constitutes an additional aspect of the present invention in that it allows the implementation of wiring changes by a single wireman thereby resulting in a reduction in cost of both labor and material required to effect a wiring change.

BRIEF DESCRIPTION OF THE DRAWINGS

The aforementioned aspects, features and objects of the invention, as well as other aspects, features and objects will be better understood upon a consideration of the following detailed description and the appended claims in connection with the attached drawings of an illustrative embodiment in which:

DETAILED DESCRIPTION

Figure 1:
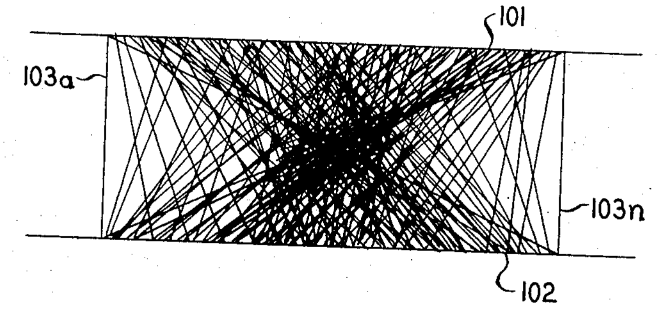
FIG. 1 (PRIOR ART)
FIG. 1 illustrates the interconnection wiring density of a prior art parallel cross-connector.

Before describing in detail the structure of a cylindrically arranged modular main distribution frame, it will be helpful to understand the ramifications of, and the benefits to be derived from, various types of cross-connection arrangements. In addition, throughout the detailed description it will be helpful to note that the first numeral of the reference characters designating each element of the invention is indicative of the figure wherein that element is most clearly illustrated.

FIG. 1 illustrates a prior art parallel cross connection arrangement wherein linear arrays of terminals 101 and 102 are interconnected by jumper cables 103*a* through 103*n*. It is to be noted that the connections are based on a random assignment of terminals which, in effect, is identical to the random interconnection of the two arrays of terminals 101 and 102. While the random interconnection of the two arrays of terminals 101 and 102 is not representative of the interconnection required in a main distribution frame wherein specified terminals must be interconnected, the random assignment of terminals occurs quite frequently in a typical main frame which does not follow a preferential terminal assignment criteria.

As FIG. 1 clearly shows, the density of the interconnection jumper cables is extremely light at the end points while the central portion shows a much heavier concentration. Removal of any of the jumper cables from this dense central region is considerably more difficult to effect than is the removal of one near the end points.

Figure 2:
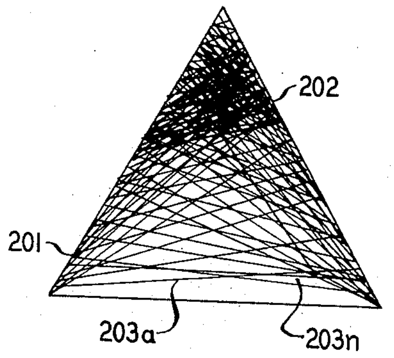
FIG. 2 illustrates the interconnection wiring density of a two-sided angularly alternating connector.

Modification of the parallel cross connector to one having a two-sided angular orientation is illustrated in FIG. 2. In this connector arrangement arrays of terminals 201 and 202 form two legs of an equilateral triangle. There are no terminals distributed along the third leg of the triangle. The two arrays of terminals 201 and 202 are randomly assigned, as was the case in the parallel cross connector. Again, the resultant effect is identical to the random interconnection of the two arrays of terminals 201 and 202 by jumper cables 203*a* through 203*n* in that such interconnection is representative of a main frame which does not utilize a preferential terminal assignment criteria. It should be noted that in this arrangement the density of the interconnection wiring is somewhat concentrated near the point where the two arrays of terminals 201 and 202 meet.

Figure 3:
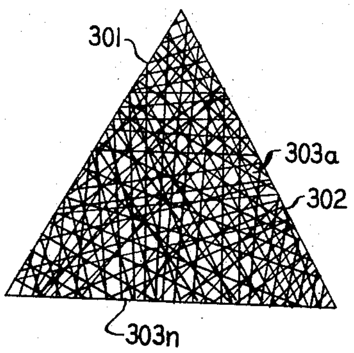
FIG. 3 illustrates the interconnection wiring density of a triangularly arranged connector.

Utilization of the third leg of the equilateral triangle, as illustrated in FIG. 3, results in a more uniform density of interconnection wiring than is realizable with the two-sided configuration. In this case arrays of terminals 301 and 302 are again randomly assigned. Where a direct interconnection is feasible, and in accordance with satisfying the main distribution frame interconnection constraints of having to connect a particular line terminal pair to a particular equipment terminal pair, such a connection is implemented directly by a jumper cable such as cable 303*a*. Where a direct interconnection is not feasible, the connection is completed by utilization of a guide strip arrangement along the third side of the triangle for routing the jumper cables, such as cable 303*n*, to a neighboring connector for termination.

Figure 4:
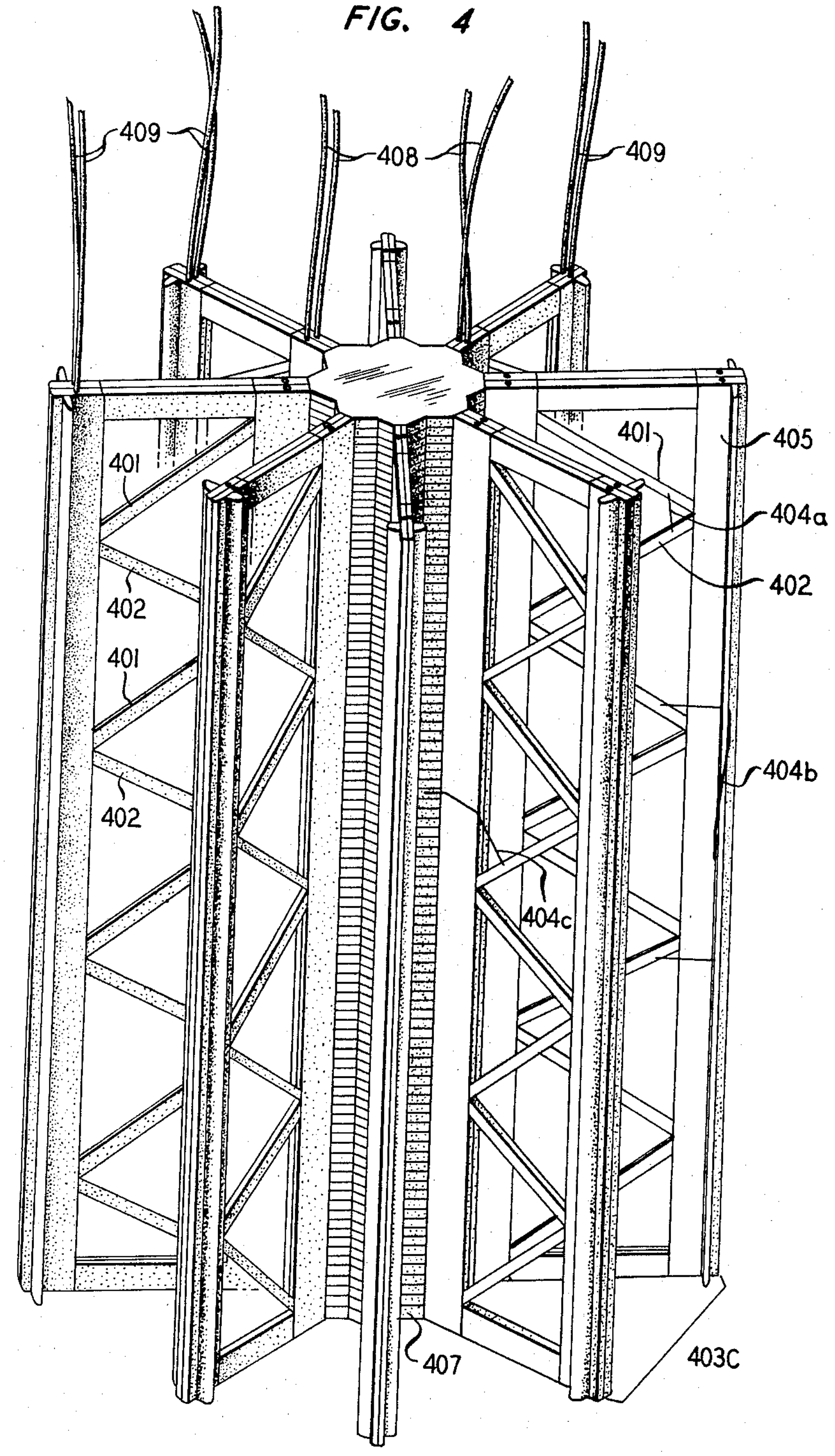
FIG. 4 is a front view of a cylindrically arranged modular main frame.
Figure 5:
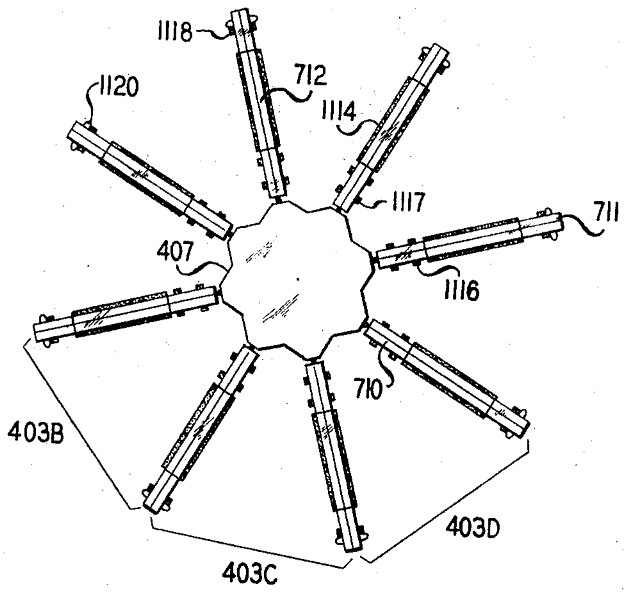
FIG. 5 is a top view of a cylindrically arranged modular main frame.

The relevance of the foregoing discussion as applied to main distribution frames, along with a better understanding of the significance of using a three-sided cross connector in such a frame, follows from an examination of FIGS. 4 and 5. Illustrated is a cylindrically arranged main distribution frame having a plurality of main frame modules 405 radially arranged about a stack of interconnection circuit boards 407. For the example used herein, eight modules 405 are utilized, but in actuality any other number of modules 405 is equally suitable. A bay 403 in this arrangement comprises the equipment mounted on facing halves of circumferentially adjacent modules 405.

Outside cable pairs from individual subscribers are brought into a central office in cables 408 with two such cables 408 being fed to each module 405. The cable pairs in the two cables 408 serving a given module 405 are terminated on plural terminal strips 401, with the cable pairs being uniformly distributed to all of the terminal strips 401 on the given module 405. These terminal strips 401 extend downward and radially outward from the center of the entire frame structure. In addition, the central office equipment cable pairs are fed to the main frame via cables 409 with two such cables 409 being fed to each individual module 405. The equipment cable pairs in the two cables 409 serving a given module 405 are terminated on plural terminal strips 402 on the given module 405. As was the case with the line cable pairs the equipment cable pairs are uniformly distributed to all of the terminal strips 402 in module 405 served by the two cables 409. Terminal strips 402 extend upward and radially outward from the frame center. More will be said about the distribution, combination and termination of the outside cable pairs and equipment cable pairs in a subsequent discussion.

As illustrated in FIG. 4, where direct interconnection is feasible between a particular pair of outside cable terminals on a terminal strip 401, and a specified pair of equipment cable terminals on an adjacent terminal strip 402, the connection is made by a jumper such as cable 404*a*. This jumper and all other jumpers are two-conductor cables. Where a specified pair of outside cable terminals, located on a terminal strip 401, are to be connected to a particular pair of equipment cable terminals on a terminal strip 402, which is not vertically adjacent to that terminal strip 401, but both of these terminal strips 401 and 402 are located on the same side of module 405, the interconnection is effected by a jumper cable such as the cable 404*b*.

Where the outside cable terminals and the equipment cable terminals to be interconnected are located on different modules 405, interconnection is effected via jumper cables such as cable 404*c*. A first jumper cable such as cable 404*c* interconnects a particular pair of terminals on terminal strip 402 on a first module 405 to an appropriate one of the interconnection circuit boards in stack 407 while a similar second jumper cable 404*c* (not shown) interconnects the corresponding second module 405 with the same interconnection circuit board in stack 407 at a point electrically opposite to the point where the first jumper cable 404*c* was terminated, thereby completing the interconnection. This type of interconnection will be further described when reference is made to FIGS. 13 and 14.

Figure 6:
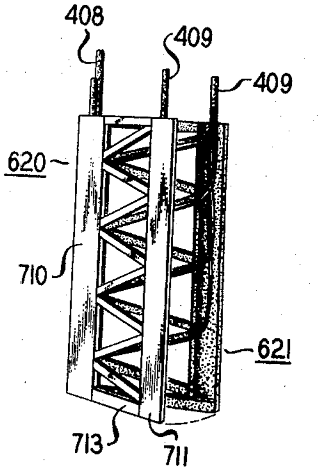
FIG. 6 illustrates the bifurcated construction of a module.
Figure 7:
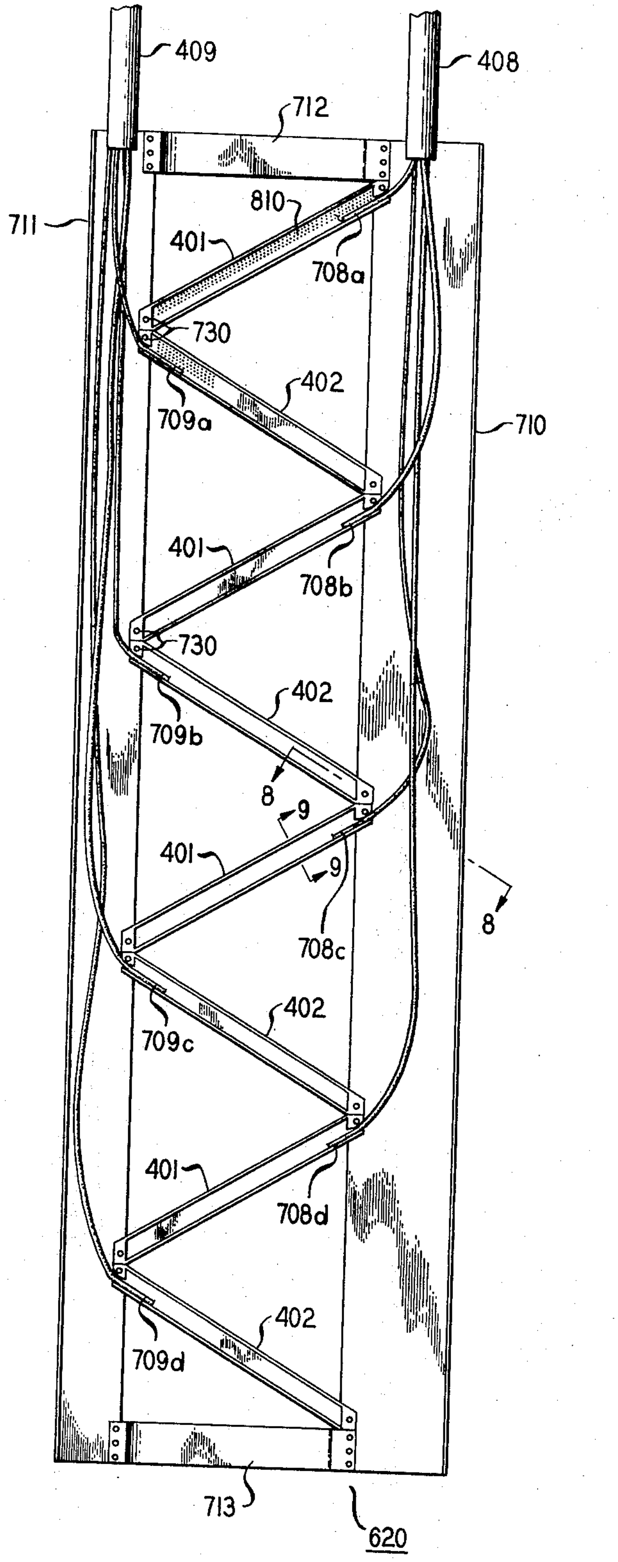
FIG. 7 is an interior view of one-half of a single module illustrating cable distribution and combination features.

The structural details of one of the interconnection modules 405, all the modules 405 being the same, will be described in conjunction with a consideration of FIGS. 6 through 12. Each module 405 is a bifurcated structure comprised of mirror-image mating members 620 and 621 pivotally engaged along the left-hand edges as shown in FIG. 6. The bifurcated structure facilitates the termination of the outside cable pairs, and the equipment cable pairs on the plural terminal strips 401 and 402 on a module 405. Each of the mating members 620 and 621 has an outside cable distribution channel 710 and an equipment cable combination channel 711. The outside cable distribution channel 710 of member 620, as shown in FIG. 7, provides a conduit for dividing the main outside cable 408 into several smaller cables 708*a* through 708*d* for distribution to each of the terminal strips 401. Similarly, the equipment cable combination channel 711 provides a conduit for the grouping of several smaller cables 709*a* through 709*d*, having individual terminations on terminal strips 402, into a single primary equipment cable 409. A separate set of subcables 708*a* through 708*d* and 709*a* through 709*d* are housed in channels 710 and 711 of member 621. For each of the members 620 and 621, the outside cable distribution channel 710 and the equipment cable combination channel 711 are joined to one another via an upper horizontal support member 712 and a lower horizontal support member 713.

Terminal strips 401 and 402 are connected to outside cable distribution channel 710 and to equipment cable combination channel 711 with fasteners 730. The connection of terminal strip 401 to outside cable distribution channel 710 is made at a point which is higher in elevation than the connection point to equipment cable combination channel 711 in order that terminal strip 401 has a negative slope when viewed from the outside cable distribution channel 710. Correspondingly, the connection of terminal strip 402 to equipment cable combination channel 711 is made at a point which is higher in elevation than the connection point to outside cable distribution channel 710 so that terminal strip 402 has a positive slope when viewed from outside cable distribution channel 710. By utilizing terminal strips 401 and 402 in this manner, the advantages of the triangular cross connector as indicated with regard to FIG. 3 are beneficially made available.

Figure 8:
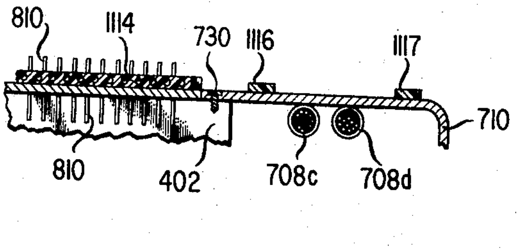
FIG. 8 is a cross-sectional view of a cable distribution structure.

FIG. 8 shows a cross-section of outside cable distribution channel 710 at line 8—8 in FIG. 7. As illustrated, outside cable distribution channel 710 is a generally U-shaped structure which houses the smaller subcables 708*c* and 708*d* derived from the division of main outside cable 408. Subcables 708*a* and 708*b* are also housed in distribution channel 710, but do not appear at the point where the cross-sectional view is taken.

Each terminal strip 402, a part of one being shown in FIG. 8, has affixed therein a plurality of terminals 810. These terminals 810 are of a type such as wire-wrap terminals. HOwever, any other of the well-known electrical terminals, such as solder terminals or quick connect terminals, might be equally advantageously employed. The only constraint is that the terminals 810 extend through terminal strip 402 and be accessible from either side. A further plurality of terminals 810 are also similarly affixed to each of the terminal strips 401.

Figure 9:
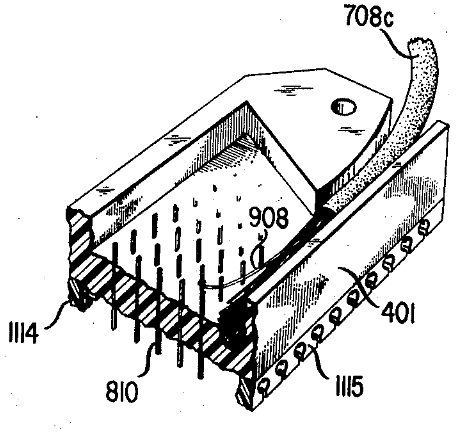
FIG. 9 is a partial perspective view of a terminal block.

FIG. 9 illustrates a partial perspective view of terminal strip 401 wherein outside subcable 708*c* is terminated. The view in FIG. 9 is a cross-section of terminal strip 401 at line 9—9 in FIG. 7. Each wire 908 of an outside cable pair contained in subcable 708*c* is electrically connected to a terminal 810 by means of an appropriate method consistent with the type of terminal employed. It should be noted that wire wrap terminals are illustrated with the terminals 810 extending completely through the terminal strip 401. On the exterior edges of terminal strip 401 there are attached guide strips 1114 and 1115. Terminal strips 402 have identical cross sections to terminal strips 401.

Figure 10:
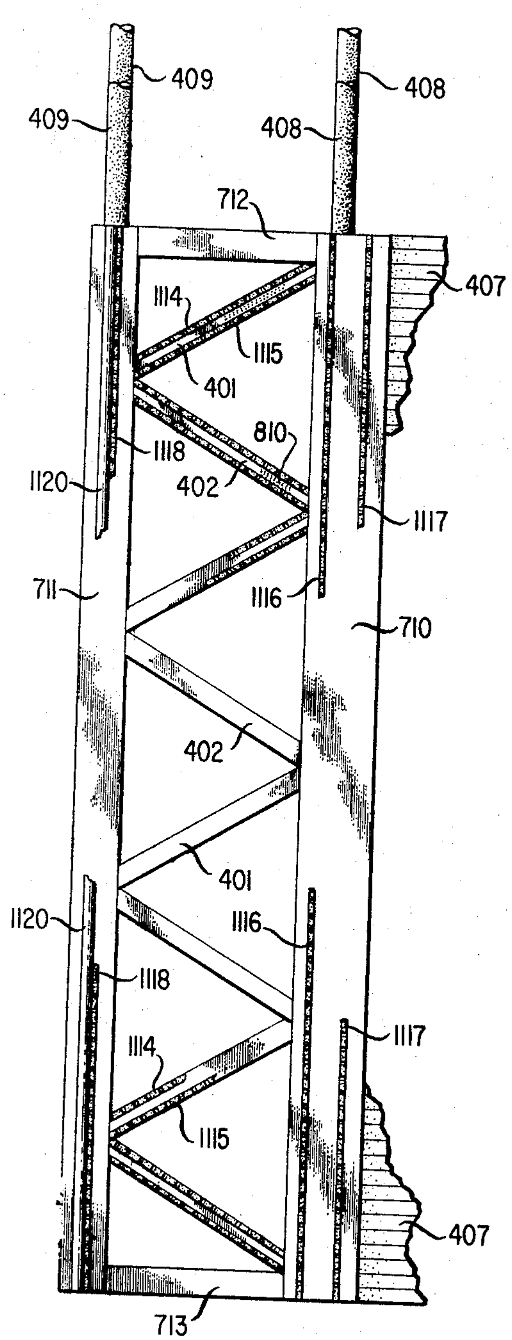
FIG. 10 is a front view of a single module.
Figure 11:
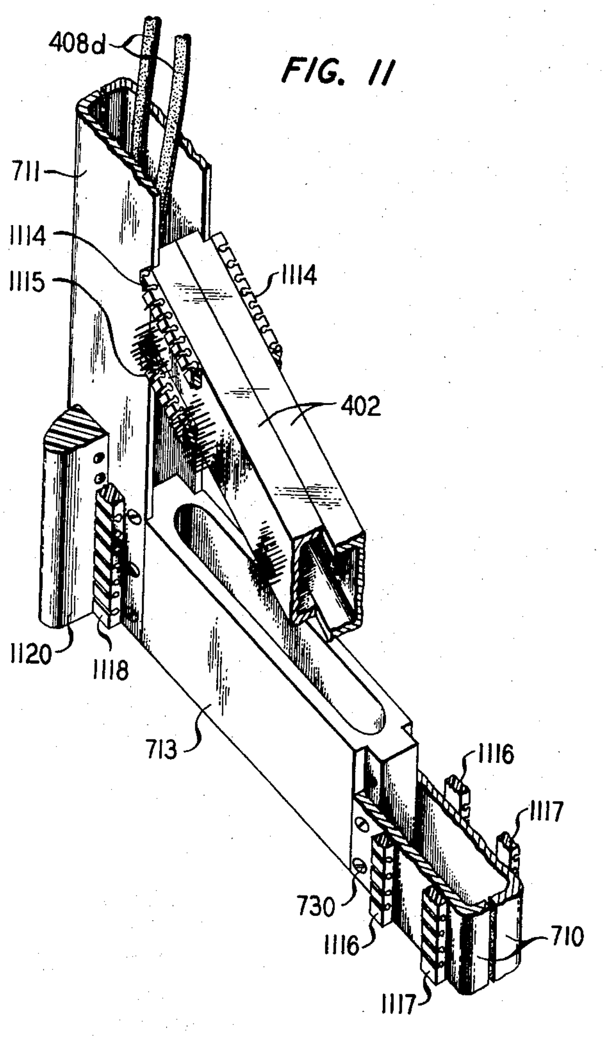
FIG. 11 is a partial perspective view of the bottom portion of a single module.

A front view of a module 405 is shown in FIG. 10, with a partial perspective view of the bottom portion of module 405 shown in FIG. 11. These two illustrations more accurately show the location of the guide strips 1114 and 1115 first shown in FIG. 9. As indicated in FIGS. 10 and 11, the guide strips 1114 and 1115 are attached to either side of every terminal strip 401 and 402 mounted on the two bifurcated parts 620 and 621 of module 405. Similar guide strips 1116 and 1117 are affixed vertically about either side of outside cable distribution channel 710, and guide strip 1118 is affixed to equipment cable combination channel 711 along the interior edge of fin-like protrusion 1120.

Figure 12:
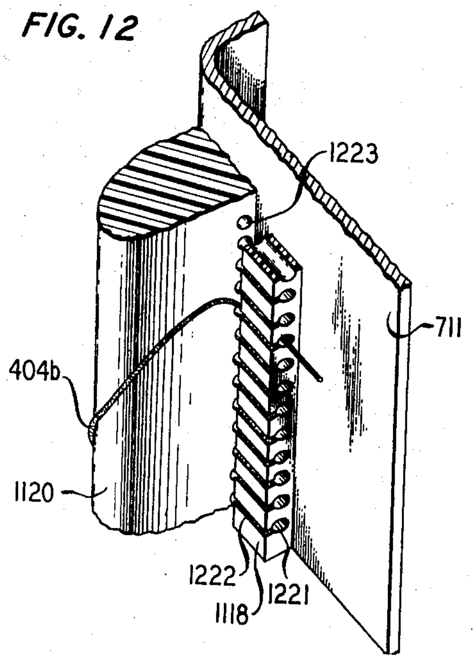
FIG. 12 illustrates the intra-bay parallel jumper wiring arrangement.

Structural details relating to the positioning of guide strip 1118 about the fin-like protrusion 1120 on equipment cable combination channel 711 are illustrated in FIG. 12. This guide strip 1118 holds the jumper cables 404*b* in a substantially parallel orientation with respect to one another as they interconnect specified outside line terminals 810 on terminal strip 401 with specified equipment cable terminals 810 on a nonadjacent terminal strip 402 within the same module 405. Maintaining the substantially parallel orientation of the jumpers 404*b* greatly facilitates the removal of such a jumper when a connection change is to be effected.

The guide strips 1114 through 1118 have a plurality of apertures 1221 therein, each of the apertures 1221 being substantially larger in diameter than the diameter of a jumper cable such as cable 404*b*. In addition, access to each of the apertures 1221 is obtained via a gap 1222 having a width only slightly larger than the diameter of a jumper cable such as cable 404*b*. This construction facilitates the insertion of a jumper cable such as cable 404*b* through the gap 1222 and into the aperture 1221 where it is securely held in place as the jumper cable 404*b* is routed to other locations on the module 405 by tensile forces directed along the longitudinal axis of guide strip 1118.

To facilitate the entry of a jumper cable 404*b* into the illustrated region of equipment cable combination channel 711 in FIG. 12 from a remote terminal strip 401 or 402 in the same module 405, after such jumper cable has been looped about the fin-like protrusion 1120, a plurality of apertures 1223 are provided in the fin-like protrusion 1120. By aligning the apertures 1221 in guide strip 1118 with apertures 1223 in fin 1120 so that they are in one-to-one correspondence with each other, the jumper cable 404*b* is easily threaded back into the central portion of module 405 wherein terminal strips 401 and 402 are mounted. It should be noted that the plurality of apertures 1223 in fin 1120 are linearly arranged parallel to a line of intersection between a vertical plane containing the equipment cable combination channel 711 and the outside cable distribution channel 710 with a vertical plane containing the fin-like protrusions 1120.

Having described the structural details of the modules 405, it should be readily apparent that the interconnection of a specified pair of outside cable terminals 810 on terminal strip 401 to a specified pair of equipment cable terminals 810 on terminal strip 402, where the terminal strips are adjacent to one another, is straightforward. A jumper cable such as cable 404*a* is connected to a pair of terminals 810 on terminal strip 401 in an appropriate manner consistent with the type of terminal 810 employed. For the illustration used herein, this connection is effected by wire wrapping techniques. If the specified pair of equipment cable terminals 810 on terminal strip 402, to be interconnected with the specified pair of outside cable terminals 810, on a terminal strip 401 which is directly above terminal strip 402, jumper cable 404*a* is inserted into guide strip 1114 on terminal strip 402, fed vertically upward to terminal strip 401 where it is inserted into guide strip 1115 attached to terminal strip 401, and then connected to the specified terminals 810 on the terminal strip 401. A similar approach is to be followed where the terminal strip 401 is directly below the terminal strip 402.

In making the connection between specified outside cable terminals 810 on terminal strip 401 and specified equipment cable terminals 810 on terminal strip 402, where the two terminal strips 401 and 402 are not vertically adjacent to one another but are on the same side of the same module 405, a jumper cable such as cable 404*b* is connected to terminals 810 on terminal strip 401 and brought out perpendicularly through guide strip 1114. The jumper cable 404*b* is then inserted into guide strip 1118, stretched over fin-like protrusion 1120 and extended vertically along fin-like protrusion 1120 to a point just opposite the terminal to which connection is to be made. At this point the jumper 404*b* is fed back through the aperture 1223 in fin-like protrusion 1120 and through an aperture 1221 in guide strip 1118. The jumper 404*b* is then inserted into guide strip 1115 on terminal strip 402 and connection is made to the appropriate terminals 810.

As indicated previously, where terminal strip 401 which has terminated thereon outside cable pairs is on a first module 405, whereas an equipment cable pair to which connection is to be made is terminated on a terminal strip 402 which is on a second module 405, the interconnection is effected through the stack of interconnection circuit boards 407. This stack of interconnection circuit boards 407 is comprised of an alternating sequence of two types of boards with a first interconnection board 1309 illustrated in FIG. 13 and a second interconnection board 1409 illustrated in FIG. 14. Additional structural detail of boards 1309 and 1409 are presented in FIGS. 15 and 16. These four figures should be considered as a group throughout the following description.

Figure 13:
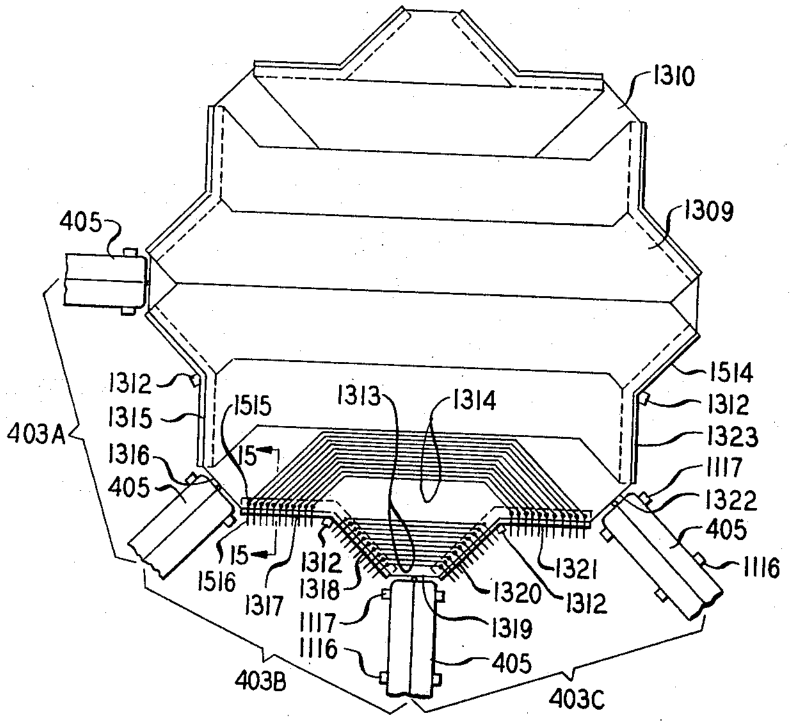
FIG. 13 is a bottom view of a first inter-bay interconnection circuit board.
Figure 14:
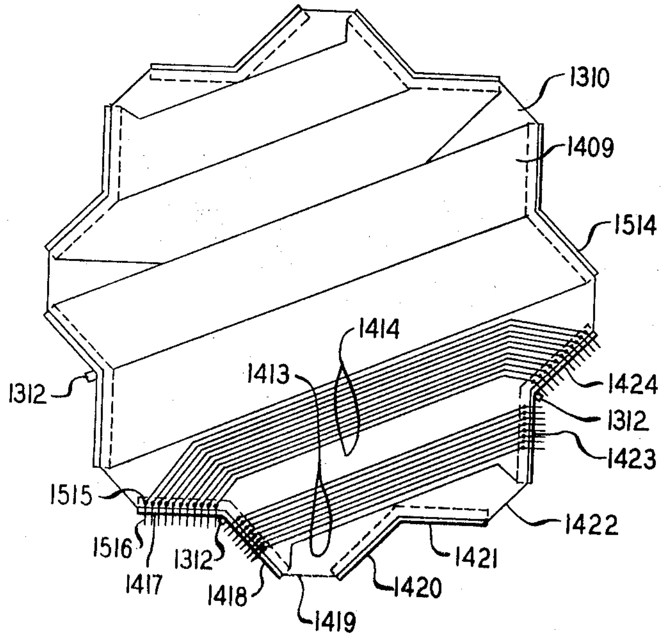
FIG. 14 is a bottom view of a second inter-bay interconnection circuit board.

The first interconnection circuit board 1309 is a polygon-shaped insulating substrate 1310 on which is deposited a series of adjacent bands of parallel conductors, such as 1313 and 1314 as shown in FIG. 13. The substrate 1310 is configured such that a group of three adjacent edges, such as edges 1315 thorugh 1317, 1318 through 1320 or 1321 through 1323 are provided on circuit board 1309 for each module 405. Modules 405 are positioned perpendicular to the center edge, such as 1316, 1319 and 1322, of each edge group.

Figure 15:
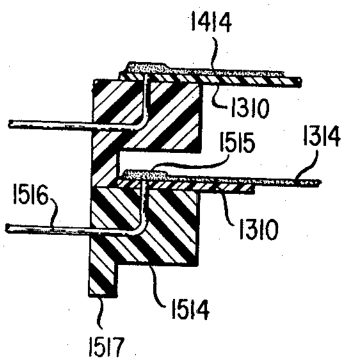
FIG. 15 is a cross-sectional view of the interconnection circuit board termination arrangement and stacking structure.
Figure 16:
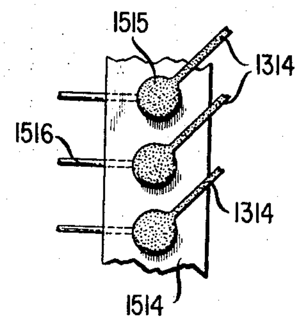
FIG. 16 is an interior view of the interconnection circuit board wiring termination arrangement.

Each of the bands of parallel conductors, such as 1313 and 1314, connects a pair of symmetrically opposite edges, such as 1318 to 1320 and 1317 to 1321, respectively, centered about an axis of symmetry passing through module abutting edge 1319 and a similar edge diametrically opposite thereto. Printed circuit lands 1515, as shown in FIGS. 15 and 16, are provided for terminating each conductor in the band of parallel conductors 1313 and 1314. In addition, terminal blocks 1514, having terminals 1516 either embedded therein or affixed thereto, are mounted at each of these electrically interconnected, symmetrically opposite edges, such as 1317 and 1321. Electrical continuity between the terminals 1516 and parallel conductors 1313 or 1314 is effected by soldering an end of each terminal 1516 which extends through the board 1309 to a different one of the circuit lands 1515.

With regard to the second interconnection board 1409, which is also a polygon-shaped substrate 1310 similar to that of the first interconnection board 1309, the bands of parallel conductors 1413 and 1414 interconnect symmetrically opposite edges, such as 1417 to 1424 and 1418 to 1423, respectively, located about an axis of symmetry passing through the intersection of edge pair 1420 and 1421 and the intersection of an edge pair diametrically opposite thereto. Each of the parallel conductors in the band of conductors 1413 or 1414 is terminated in the same manner as is each conductor in the bands of conductors 1313 or 1314 on the first interconnection board 1309.

It should be noted that the first interconnection board 1309 has eight bands of parallel conductors, whereas the second interconnection board has six bands of parallel conductors. The difference derives from the requirement of having each module 405 directly accessible from every other module 405, and will be explained more fully in conjunction with an example discussed herein below.

To maintain vertical alignment of the stack of interconnection circuit boards 407, each of the terminal blocks 1514 on the first and second interconnection boards 1309 and 1409 has a projecting lip 1517 on an exterior edge which is perpendicular to the plane of the substrate 1310. This lip 1517 has a vertical thickness which slightly exceeds the combined thickness of the insulating substrate 1310, the band of parallel conductors 1314 and the printed circuit lands 1515. In addition, the terminal block 1514 is mounted to substrate 1310 such that block 1514 extends over the edge of substrate 1310 by an amount equal to the horizontal thickness of the lip 1517, thereby preventing any lateral displacement of the interconnection boards 1309 and 1409 with respect to one another after the boards are stacked.

A further aspect in relation to the interconnection circuit boards 1309 and 1409 as they are stacked in alternating sequence in stack 407 concerns the capability to electrically interconnect any one bay 403 with any other such bay. It is to be remembered that a bay 403 in this arrangement comprises the equipment mounted on facing halves of circumferentially adjacent modules 405. First interconnection boards 1309 are assigned to even numbered positions in the stack 407 with the second interconnection boards 1409 being assigned to the odd numbered positions. An axis of symmetry, about which the bands of parallel conductors such as 1413 and 1414 on interconnection board 1409 are located on the first board in the stack 407, is initially set so as to define an angle of about 22.5° with respect to a similar axis of symmetry on the adjacent interconnection board 1309. By rotating clockwise each succeeding even numbered board 1309 45° with respect to a directly preceeding even numbered board 1309 and by rotating clockwise each succeeding odd numbered board 1409 45° with respect to a directly preceeding odd numbered board 1409, each bay 403 is connectible to every other bay 403.

For example, as shown in FIG. 13, bands of parallel conductors 1313 and 1314 extend between bay 403B and bay 403C. By rotating the interconnection board 1309 clockwise through an angle of 45°, bands of parallel conductors 1313 and 1314 now extend between bay 403A and bay 403B. It should be observed that regardless of the number of rotations the bands of parallel conductors never extend directly between bay 403A and bay 403C. Hence in order to have every bay 403 directly accessible to every other bay 403, the two different types of interconnection boards 1309 and 1409 are required. In view of the fact that the first and second interconnection boards 1309 and 1409 are interleaved a total of seven boards results in each bay 403 being connectible to any other bay 403. Since considerably more than seven boards are advantageously used in a stack 407, this approach to interconnection further reduces the length of jumper cables as a result of the increased number of bay interconnection circuits.

The angular rotation criterion as described above is more generally stated in that the *n*th first interconnection board 1309 is rotated through a clockwise angle which is $45(n-1)°$ with respect to the first such board 1309 at the top of stack 407, whereas the *m*th second interconnection board 1409 is rotated through a clockwise angle which is $45(m-1)°$ with respect to the first such second board 1409 at the top of stack 407, where *m* and *n* are integers. The stack 407 is attached to each module 405 through the pivot point of the bifurcated structure 620 and 621.

With the structural details of the interconnection circuit boards 1309 and 1409 described as above, the interconnection of one bay 403 with another bay 403 can be clearly described. FIGS. 4, 10, 11 and 13 will be utilized for this description. Specifically, a first jumper cable such as cable 404*c* is connected to a specified pair of terminals 810 on a terminal strip 402. The jumper cable 404*c* is then inserted into a guide strip 1114 on terminal strip 402 and fed toward the center of the frame through guide strips 1116 and 1117. Insertion into guide strip 1116 is made at a point approximately horizontal to terminals 810, whereas insertion into guide strip 1117 is made at a point approximately horizontal to the requisite pair of terminals 1516 on an appropriate interconnection board 1309 or 1409. The appropriate interconnection board is selected on the basis of source bay 403 to destination bay 403 and, as noted previously, should be one of seven boards near the terminals 810 on terminal strip 402. With the appropriate board selected the jumper cable 404*c* is connected to the requisite pair of terminals 1516 on that board.

At the destination bay 403, the inverse procedure is followed with a second jumper cable such as cable 404*c* coupling the terminals 1516, which are electrically connected to the first jumper cable 404*c*, to the terminals 810 on a terminal strip 401. This second jumper cable 404*c* is inserted into guide strips 1115, 1116 and 1117 located in the destination bay 403 at points comparable to those discussed with regard to the first jumper cable 404*c*. In this manner the equipment cable pairs in the source bay 403 are interconnected with the line cable pairs in the destination bay 403.

The cylindrical configuration of the modular main distribution frame lends itself to a systematic terminal assignment and interconnection criterion. Of paramount importance in the implementation of such a systematic terminal assignment and interconnection criterion is the uniqueness with which each pair of terminals in the main frame must be identified. Once each terminal pair in the main frame is uniquely identified, then the assignment of those terminals to be interconnected can be advantageously made in accordance with a preferential or proximity assignment criterion by any general purpose electronic data processing system or by manual means in the absence of such equipment.

Figure 17:
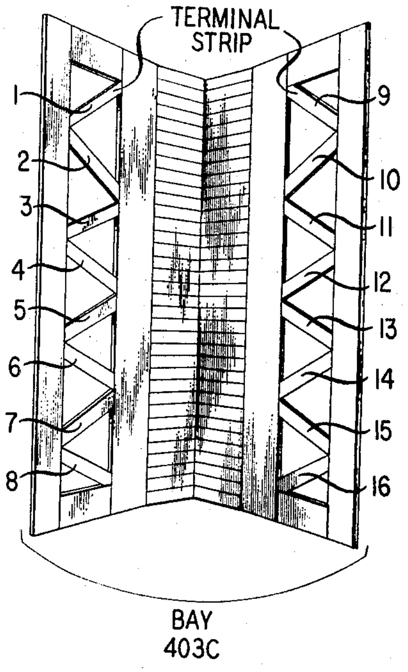
FIG. 17 is a bay and terminal strip numbering plan which can be advantageously utilized in a computerized service order assignment system.

FIG. 17 illustrates one terminal identification scheme which meets the uniqueness requirements. As noted previously, a bay 403 in the cylindrically arranged modular main distribution frame comprises the equipment housed on facing halves of circumferentially adjacent modules 405. Bays 403 are identified by alphabetic characters assigned consecutively in a counterclockwise direction beginning with any predetermined bay. For example, bay C is shown in FIGS. 4, 5, 13 and 17.

Having uniquely identified each bay 403, the terminal strips 401 and 402 mounted thereon are consecutively numbered from one to *k* beginning with one in the upper lefthand corner and ending with *k* in the lower righthand corner of the bay 403 as shown in FIG. 17. Individual terminals 810 on each terminal strip 401 or 402, partially shown in FIG. 10, are numbered in pairs consecutively from left to right and from top to bottom. It should be remembered that a bay 403 is comprised of facing halves of circumferentially adjacent modules 405 so that the opposite half of any module 405 also has a field of terminals 810 thereon but those terminals 810 are to be associated with a different bay 403, are are not to be directly interconnected since to do so precludes the opening of the bifurcated structure for maintenance, repair or testing.

Figures 18, 19:
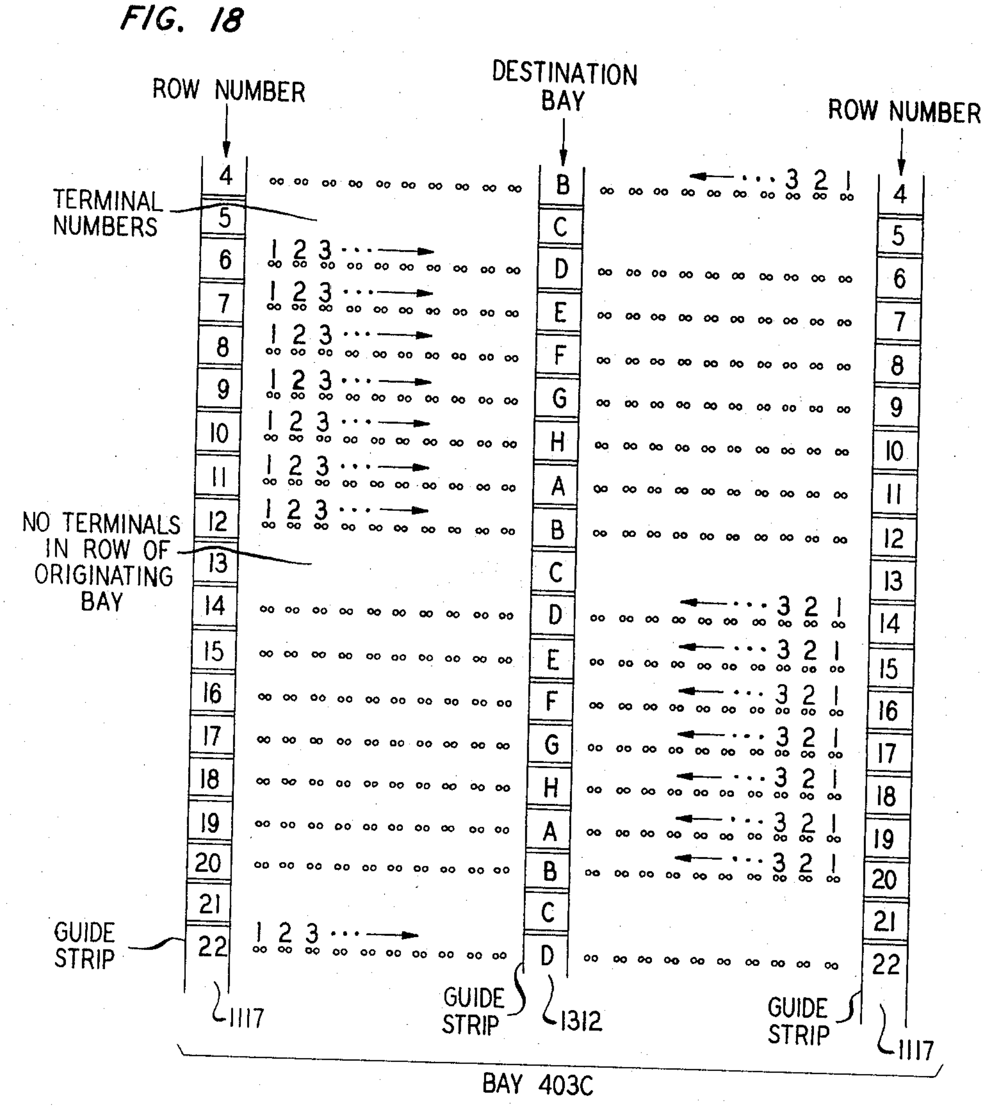
FIG. 18 is a numbering plan for intermodule terminals.
FIG. 19 is a sample service order which would be utilized in a computerized service order assignment system.

In addition to the foregoing, the numbering plan for the interconnection circuit board stack 407 is shown in FIG. 18. The stack of interconnection circuit boards 407 are assigned row numbers in a monotonically increasing sequence from the top of the stack 407 to its bottom. These row designations are marked on the guide strips 1117 which are attached to outside cable distribution channel 710 of each module 405. An additional guide strip 1312, similar to guide strips 1116, 1117 and 1118 and not previously referred to is attached to the stack 407 and located midway between the two modules 405 in the bay 403. This guide strip 1312 bears the destination bay 403 designation to which the terminals 1516 on any interconnection board 1309 or 1409 interconnect. In addition, it is used to keep jumper cables such as cable 404*c* fixed to a bay 403 when the jumper cable 404*c* is connected to a pair of terminals 1516 which are on the opposite side of guide strip 1312 with respect to the point of origination, and when the jumper cable 404*c* is connected to a pair of terminals 810 on the opposite face of the bay 403.

The terminals 1516 are numbered as pairs in an increasing sequence from right to left and left to right in alternating blocks separated by the blank rows. This numbering begins at one of the edge mounted guide strips 1117 and continues through the center guide strip 1312, which carries the destination bay designation to the opposite edge mounted guide strip 1117.

Having completely identified each and every terminal pair in the main distribution frame, a typical interconnection service order is illustrated in FIG. 19. Where the interconnection to be effected is intra-bay, a single jumper cable 404 is required and the terminals 810 to be coupled are completely identified by bay, terminal strip and terminal designations. For the example shown, terminals number 19 on terminal strip 6 in bay C are connected to terminals number 105 on terminal strip 7 in bay C. Where the interconnection to be effected is inter-bay, then two jumper cables such as cables 404*c* are required. The first jumper cable 404*c* couples particular terminals 810, identified by bay, terminal strip and terminal designations, to particular terminals 1516 on the interconnection circuit board 1309 or 1409. For the example used herein, terminals number 52 on terminal strip 4 in bay C are coupled to terminals number 5 in row 8 of bay C. The second jumper cable 404c connects the specified terminals 1516 on the interconnection circuit board 1309, to the requisite terminal 810 on the destination bay. Since row 8 is an even numbered row, a first interconnection circuit board 1309 is utilized. For the example, terminals number 5 of row 8 in bay F are connected to terminals number 83 in block 9 of bay F. Other terminal numbering plans can be advantageously utilized so long as each pair of terminals receives a uniquely defined designation.

In summary, the cylindrically arranged modular main distribution frame, wherein the terminal strips 401 and 402 are angularly oriented with respect to one another on the module 405, and wherein each module 405 is connectible with every other module 405 through a stack of interconnection circuit boards 407, gives rise to a substantially reduced length of jumper cable 404 over that required to effect a connection of a linearly arranged frame, as well as a more uniform density of jumper cables over prior art main distribution frames. These two features facilitate the removal of a jumper cable 404 from the main frame thereby preventing jumper cable buildup with its consequent inefficient utilization of space. Moreover, the orderly arrangement of terminals and the compact size allows the implementation of wiring changes by a single wireman thereby effecting a reduction in cost of both labor and material.

In all cases it is understood that the above described embodiment is illustrative of but a small number of the many possible specific embodiments which can represent applications of the principles of the invention. Thus, numerous and varied other arrangements can readily be devised in accordance with these principles by those skilled in the art without departing from the spirit and scope of the invention.

What is claimed is:

1. A modular main distribution frame comprised of a plurality of modules, means for interconnecting said plurality of modules in a cylindrical configuration with each module positioned along a radius of said configuration, said interconnection means having a plurality of electric circuit conductor bands included thereon, each of said modules having affixed thereto first terminal strips for terminating outside cable pairs and second terminal strips for terminating equipment cable pairs, each module further including first and second interconnected cable conduits along longitudinal edges of said module, cable guides along said first conduit remote from the center of said main frame for defining paths for cables extending between nonadjacent terminal strips affixed to said module, and cable guides along said second conduit close to the center of said main frame for defining paths for cables extending between said module and said interconnection means.

2. A modular main distribution frame comprised of a plurality of modules having affixed thereto first terminal strips for terminating outside cable pairs and second terminal strips for terminating equipment cable pairs, each of said modules including a bifurcated support structure each part of which includes said first and second terminal strips, each of said first and second terminal strips having a plurality of terminals extending through opposite sides and accessible from either side thereof, means for electrically connecting said outside cable pairs to specified ones of said terminals on said first terminal strips and said equipment cable pairs to specified ones of said terminals on said second terminal strips, said connections being implemented on a single side of each of said parts enclosed within said bifurcated structure, and means for interconnecting said plurality of modules in a cylindrical configuration with each module positioned along a radius of said configuration, said interconnection means having a plurality of electric circuit conductor bands included thereon.

3. The modular main distribution frame in accordance with claim 2 wherein said first and second terminal strips further include guide strips affixed to parallel edges of a terminal bearing surface on said first and second terminal strips with said terminal bearing surface being opposite to the corresponding such surface enclosed within said bifurcated structure, said guide strips being parallel to a longitudinal axis of said terminal strips and having a plurality of slots therein for holding jumper wires in alignment as said wires emanate from said plurality of terminals.

4. A modular main distribution frme comprised of a plurality of modules having affixed thereto first terminal strips for terminating outside cable pairs and second terminal strips for terminating equipment cable pairs, each of said plurality of modules including first and second cable conduits, and means, including said terminal strips, for mechanically connectng said conduits together in spaced relationship, and means for interconnecting said plurality of modules in a cylindrical configuration with each module positioned along a radius of said configuration, said interconnection means having a plurality of electric circuit conductor bands included thereon.

5. The modular main distribution frame in accordance with claim 4 wherein said first terminal strips for terminating outside cable pairs include means for attaching a first end of each of said first terminal strips to said first cable conduit, and means for attaching a second end of each of said first terminal strips to said second cable conduit, said attachment to said second cable conduit being at a different elevation than said attachment to said first cable conduit, whereby each of said first terminal strips has a negative slope when viewed from said first cable conduit with all of said first terminal strips being parallel with respect to one another, and said second terminal strips for terminating equipment cable pairs include means for attaching a first end of each of second second terminal strips to said first cable conduit, and means for attaching a second end of each of said second terminal strips to said second cable conduit, said attachment to said second cable conduit being at a different elevation than said attachment to said first cable conduit, whereby each of said second terminal strips has a positive slope when viewed from said first cable conduit with all of said second terminal strips being parallel with respect to one another and interposed between said first terminal strips in alternating sequence.

6. The modular main distribution frame in accordance with claim 5 wherein each of said plurality of modules further includes means for guiding cables along one of said conduits said guiding means including a fin member having transverse apertures through a base portion thereof so cables can be passed either over or through said fin member.

* * * * *